(12) United States Patent
Pozzi et al.

(10) Patent No.: US 10,029,793 B2
(45) Date of Patent: Jul. 24, 2018

(54) DEPLOYABLE SEATBACK HOLDER FOR PORTABLE ELECTRONIC DEVICES

(71) Applicant: B/E Aerospace, Inc., Wellington, FL (US)

(72) Inventors: Alexander Nicholas Pozzi, Winston-Salem, NC (US); Francis Xavier L. Garing, Atlanta, GA (US); Robert J. Henshaw, Newnan, GA (US); Adam Britton, Atlanta, GA (US); Kosta Gianakopoulos, Highland Village, TX (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/174,242

(22) Filed: Jun. 6, 2016

(65) Prior Publication Data

US 2016/0355263 A1 Dec. 8, 2016

Related U.S. Application Data

(60) Provisional application No. 62/170,869, filed on Jun. 4, 2015.

(51) Int. Cl.
*B64D 11/00* (2006.01)
*B64D 11/06* (2006.01)

(52) U.S. Cl.
CPC .... *B64D 11/00152* (2014.12); *B64D 11/0605* (2014.12)

(58) Field of Classification Search
CPC ............ B64D 11/0015; B64D 11/0605; B64D 11/00152
USPC ............................................. 297/188.07, 238
See application file for complete search history.

(56) References Cited

U.S. PATENT DOCUMENTS

| | | | | |
|---|---|---|---|---|
| 1,243,958 A * | 10/1917 | McFarland | ............. | B60R 7/043 224/275 |
| 1,893,458 A * | 1/1933 | Tatum | .................... | B61D 33/00 108/38 |
| 5,533,774 A * | 7/1996 | Cavanaugh | .......... | B60N 2/3095 296/66 |
| 2013/0147240 A1* | 6/2013 | Lee | .......................... | B60N 2/22 297/188.05 |

* cited by examiner

*Primary Examiner* — Milton Nelson, Jr.
(74) *Attorney, Agent, or Firm* — Clements Bernard Walker PLLC

(57) ABSTRACT

A portable electronic device holder incorporated in a seatback of a passenger seat. The device holder includes a shelf and a release latch arranged to hold the respective bottom and top edges of a portable electronic device for hands-free use. The latch holds the shelf in a stowed position flush with the seatback and releases to allow the shelf to rotate away from the seatback for use. The shelf is positioned apart from a tray table, when present, so that the device holder and tray table can be deployed and used at the same time.

18 Claims, 12 Drawing Sheets

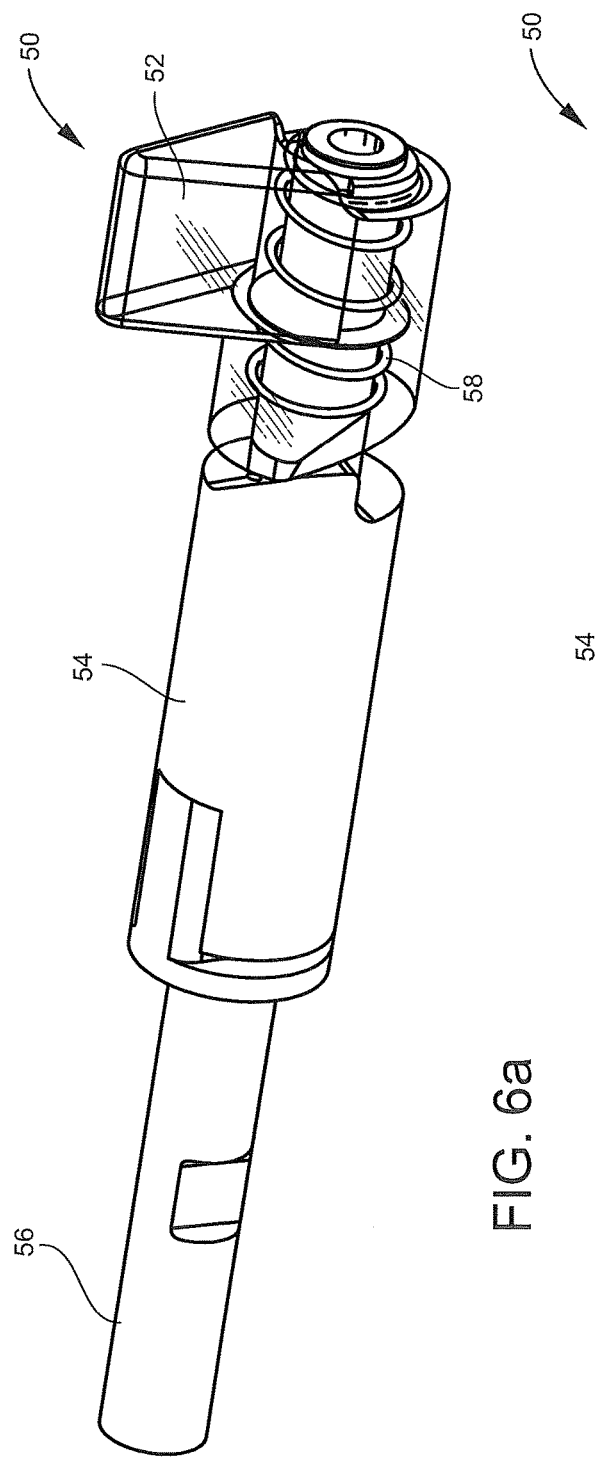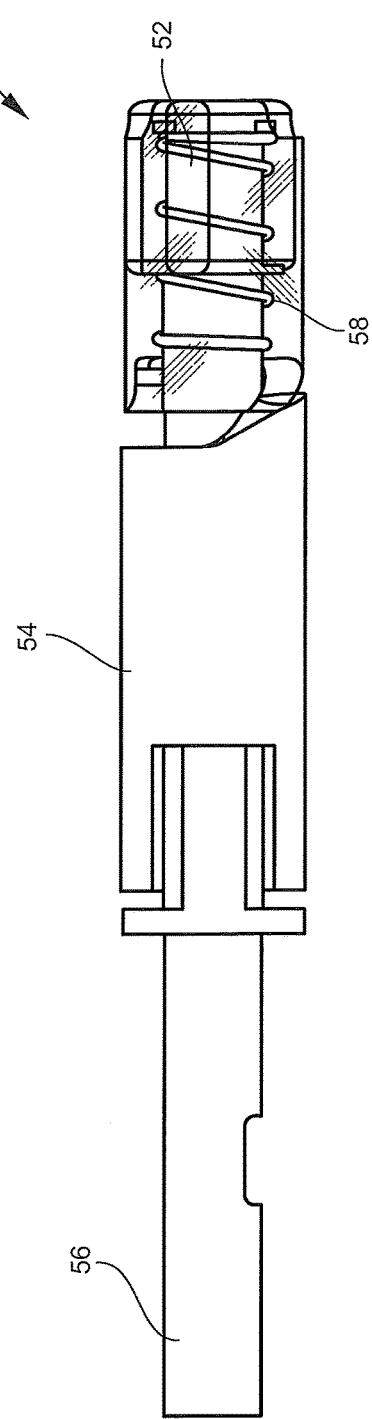
FIG. 6a
FIG. 6b

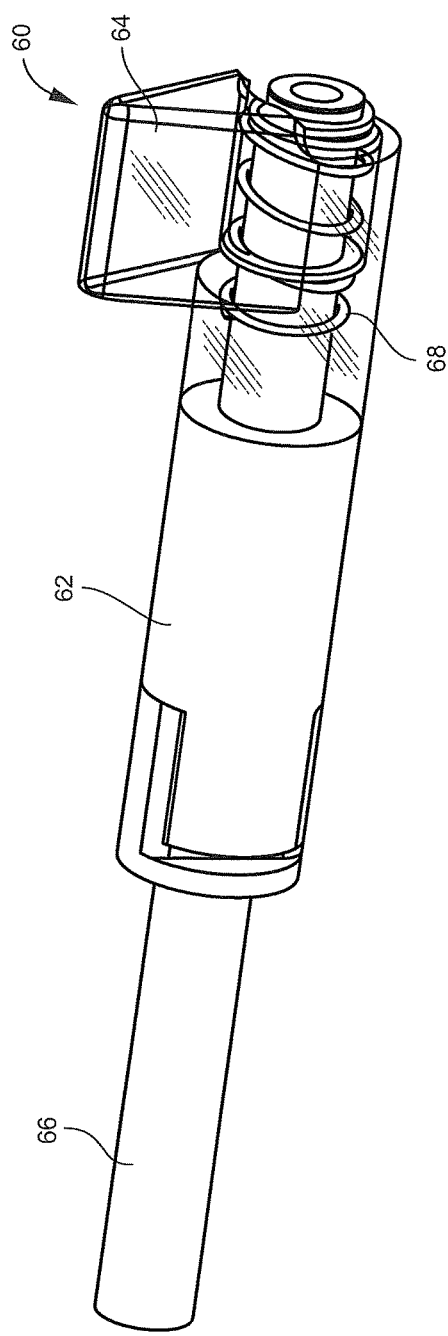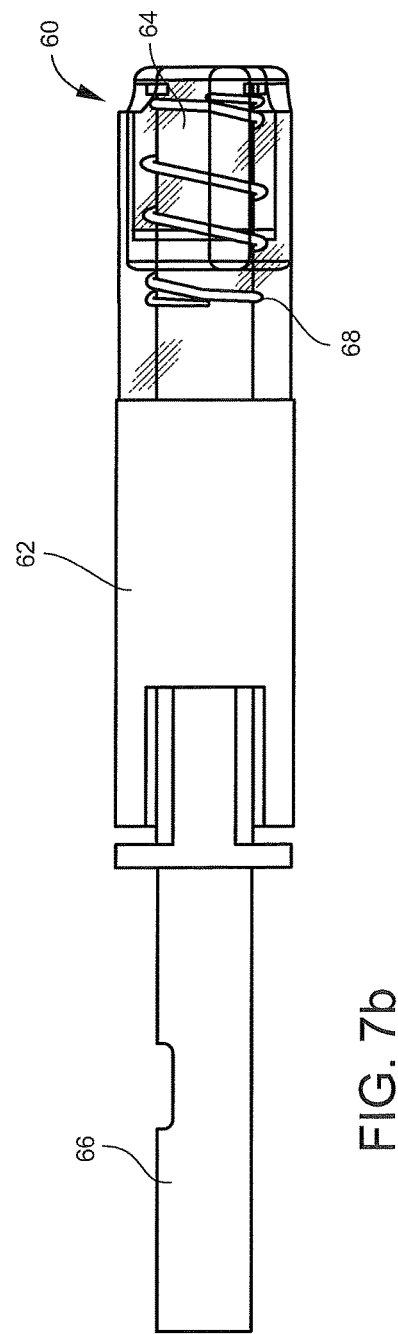
FIG. 7a
FIG. 7b

DEPLOYABLE SEATBACK HOLDER FOR PORTABLE ELECTRONIC DEVICES

CROSS-REFERENCE TO RELATED APPLICATION

This Application claims priority from U.S. Application No. 62/170,869 filed Jun. 4, 2015, the entirety of which is incorporated by reference herein.

TECHNICAL FIELD AND BACKGROUND OF THE INVENTION

The present invention relates generally to a deployable personal electronic device holder adapted to be incorporated into a seatback of a passenger seat, and more particularly, to a device holder including a releasable shelf located in an upper shroud of the seatback, wherein a latch is raised to release the shelf such that the shelf pivots open and an electronic device can be held cooperatively by the shelf and the latch for hands free use and viewing.

Personal electronics devices are in frequent use on commercial aircraft. Regulations now permit electronic devices to be used in "airplane mode" during all phases of flight. Examples of personal electronic devices include smartphones, tablets, laptops having foldable or removable keyboards, etc.

Present seating does not provide for a convenient, hands-free way of positioning portable electronic devices for ease of use and viewing. Instead, the user simply holds the device in one or both hands or props the device at a viewing angle using the deployed tray table or object supported on the lap. Thus, there exists a need for an effective way of supporting a portable electronic device for use that permits quick and easy deployment and stowage, and that does not interfere with the use of other seating components such as the tray table.

BRIEF SUMMARY OF THE INVENTION

It is an object of the invention to provide a deployable electronic device holder in a compact package conducive for aircraft passenger seat applications.

It is another object of the invention to provide a seatback holder for hands-free use of personal electronic devices such as smartphones and tablets.

It is another object of the invention to provide a device holder packaged within a seatback shroud that also supports a deployable tray table.

It is another object of the invention to position the device holder in the seatback in a location that permits simultaneous use of the device holder and the tray table.

It is another object of the invention to provide a seatback electronic device holder configured with height adjustability to accommodate various sized electronic devices.

It is another object of the invention to provide a seatback device holder for use by an aft-seated passenger during flight to accommodate their brought-aboard portable electronic device.

To achieve the foregoing and other objects and advantages, in a first embodiment the present invention provides a portable electronic device holder adapted to be incorporated into a seatback of a passenger seat. The device holder generally includes a frame adapted to install in a seatback shroud, a shelf mounted to the frame and exposed through the seatback shroud, the shelf moveable between a stowed position flush with the frame and a deployed position at an angle to the frame, and a latch slidably attached to the frame and biased in a downward direction, the latch configured to engage a top of the shelf to hold the shelf in the stowed position and raise to release the shelf to allow the shelf to move to the deployed position, The shelf, when in the deployed position thereof, is oriented to support a bottom edge of a portable electronic device and the latch is available to engage a top edge of the portable electronic device.

In a further embodiment, the shelf can be pivotally attached along a bottom edge to the frame.

In a further embodiment, the shelf can be attached to the frame through spaced arms attached near opposite ends of the bottom edge of the shelf, each of the arms having a predetermined length and curvature such that the arms retract into the seatback and are hidden when the shelf is in the stowed position and position the shelf apart from the seatback shroud when the shelf is in the deployed position.

In a further embodiment, the device holder can include a spring release mechanism associated with the shelf for rotating the shelf toward the deployed position when released from the latch, the spring mechanism including a release lever that engages at one end thereof with a spring release pivot mount mounted on a common shaft.

In a further embodiment, an end of the spring release pivot mount in contact with the end of the release lever can be a sloped surface such that engagement with the sloped surface causes rotation due to stored spring force from a spring disposed between the release lever and the shaft, wherein the spring is wound as the shelf is moved toward the stowed position.

In a further embodiment, the device holder can include a friction mechanism arranged to dampen deployment and stowage rotation of the shelf, the friction mechanism including a friction pivot mount and friction lever mounted on a common shaft and a spring disposed between the friction lever and the shaft, wherein flat facing ends of the friction pivot mount and friction lever contact to generate friction therebetween to dampen shelf rotation and the spring, when wound, urges on the friction lever to add force which slows shelf rotation during deployment and stowage.

In a further embodiment, the frame can be an elongate backplate having spaced openings flanking the shelf.

In a further embodiment, the device holder can include vertically-oriented spaced springs attached at one end to the latch and at an opposing end to the frame, the vertically-oriented spaced springs biasing the latch in a direction of the shelf.

In a further embodiment, the frame can include a backplate concealed from view behind the seatback shroud.

In another embodiment, the present invention provides an aircraft passenger seat equipped with a seatback portable electronic device holder generally including an upper seatback shroud, a backplate installed behind the upper seatback shroud, a shelf mounted to the backplate and exposed through the upper seatback shroud, the shelf moveable between a stowed position flush with the backplate and a deployed position at an angle to the backplate, and a latch slidably attached to the backplate and biased in a downward direction, the latch configured to engage a top of the shelf to hold the shelf in the stowed position and raise to release the shelf to allow the shelf to move to the deployed position. The shelf, when in the deployed position, is oriented to support a bottom edge of a portable electronic device and the latch is available to engage a top edge of the portable electronic device.

In a further embodiment, the shelf can be pivotally attached along a bottom edge to the backplate or can be attached to the backplate through spaced hinges attached to opposite ends of the bottom edge of the shelf, each of the hinges having a predetermined length and curvature such that the hinges retract within the seatback and are hidden when the shelf is in the stowed position and position the shelf apart from the upper seatback shroud when the shelf is in the deployed position.

In a further embodiment, the seat can include a USB port and an AC receptacle opening through a face of the upper seatback shroud, wherein the backplate includes spaced openings flanking the shelf for receiving the USB port and AC receptacle therethrough.

In a further embodiment, the seat can include a deployable tray table positioned below the shelf and spaced apart therefrom such that the shelf and the deployable tray table can be deployed and used at the same time.

In a further embodiment, the seat can include a torsion spring and washer clutch arranged to pre-load the shelf to impart rotational movement upon latch release, wherein the torsion spring is loaded as the shelf is moved toward the stowed position.

In a further embodiment, the latch can include a primary latch and a secondary latch.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which:

FIGS. 6a and 6b are isometric views of a spring release mechanism of the device holder;

FIGS. 7a and 7b are isometric views of a friction mechanism of the device holder;

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
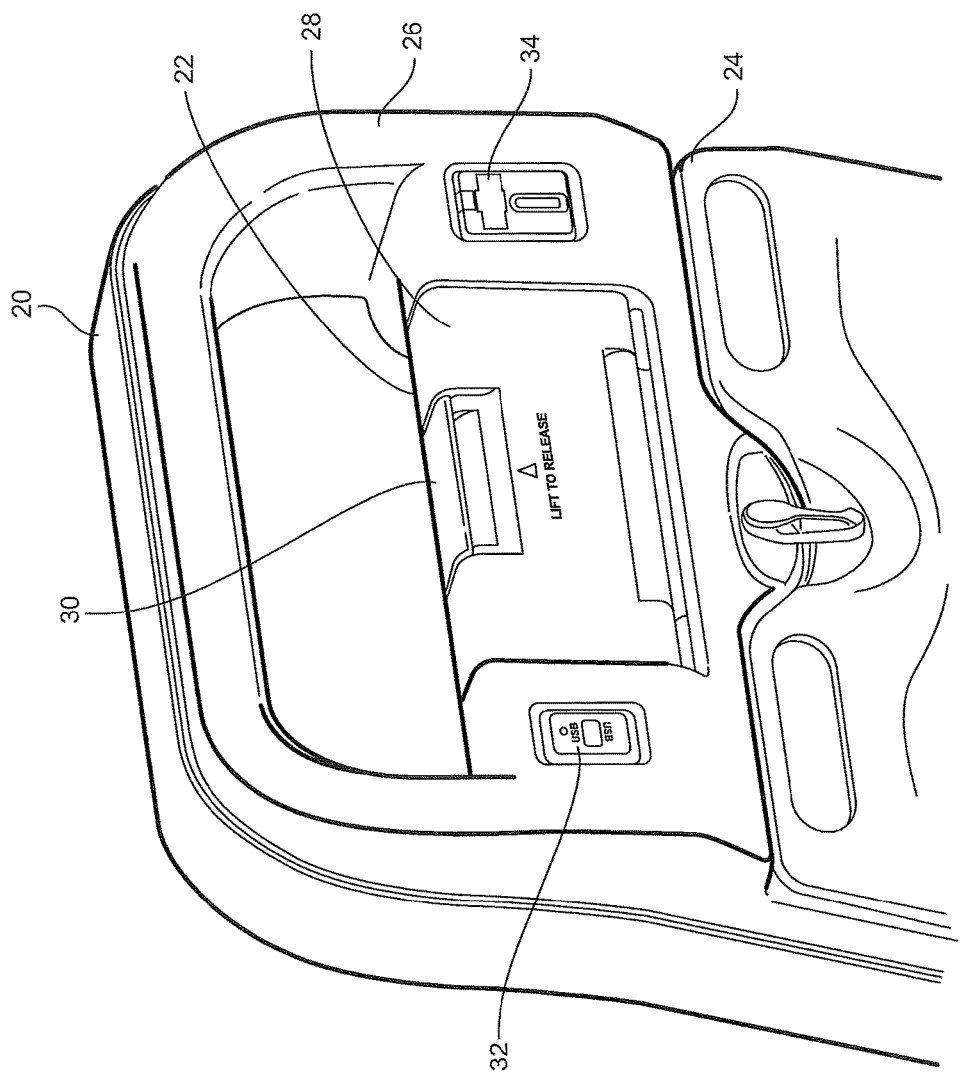
FIG. 1 is a perspective view of a seatback shroud equipped with a tray table and deployable electronic device holder according to a first embodiment of the invention.

FIG. 1 shows the upper portion of the backside of a passenger seat 20, such as a premium or economy class aircraft passenger seat of a commercial airliner. The seat can be a recline-capable seat generally including a seatback and a seat bottom. The backside of the seat 20 serves to locate amenities for use by an aft-seated passenger. Amenities as contemplated by the present invention include a deployable portable electronic device holder 22, deployable tray table 24, power and data ports, etc. The seat 20 includes an upper seatback shroud 26 that serves as a closeout to hide mechanical and electrical connections, conceal/route cabling, etc. The upper seatback shroud 26 also provides seat aesthetics, and in the present invention is configured to accommodate and present the portable electronic device holder 22.

The portable electronic device holder 22, also referred to herein as the "device holder," is positioned above the deployable tray table 24 and spaced apart therefrom such that the device holder 22 and the tray table 24 can be used by the user at the same time. The tray table 24 deploys to an ergonomic dining/working height, while the device holder 22 deploys at substantially eye level for optimum viewing angle of a portable electronic device held therein. For example, the passenger can deploy both the device holder 22 and the tray table 24 in order to dine and watch a movie simultaneously, without having to stow either one for use and enjoyment of the other.

Figure 9:
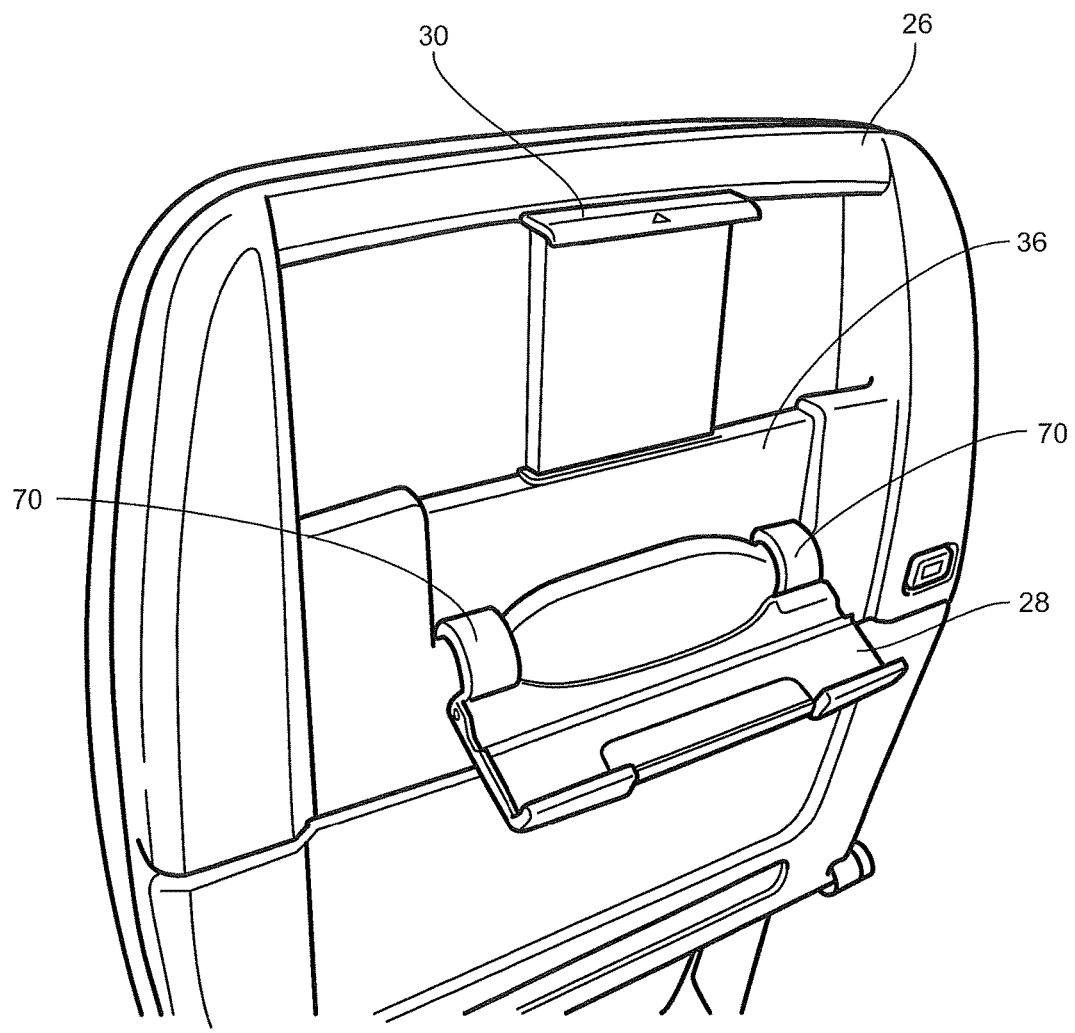
FIG. 9 is a perspective view of a seatback shroud equipped with a deployable electronics device holder according to a second embodiment of the invention.
Figure 10:
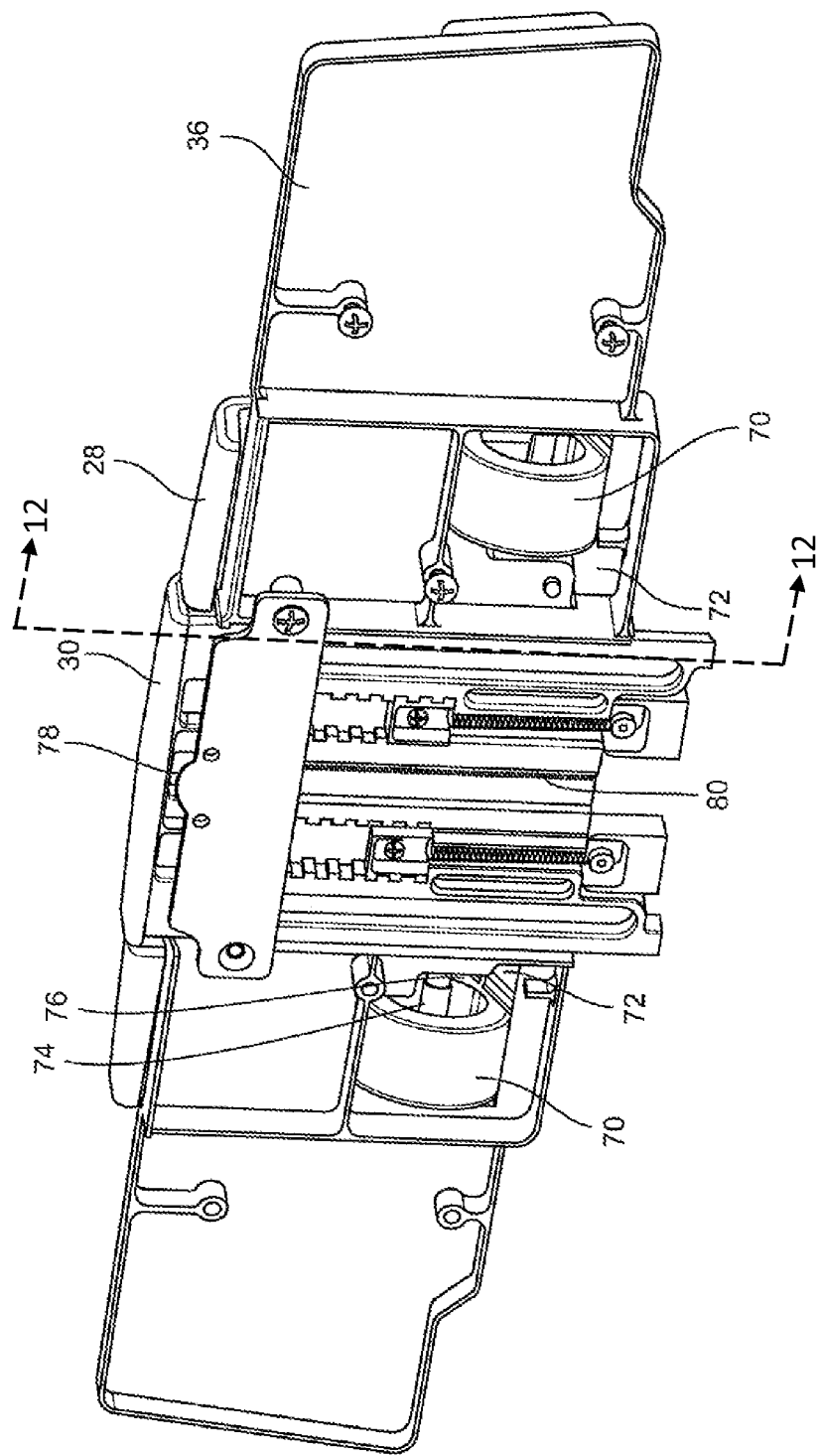
FIG. 10 is a rear perspective view of the device holder according to the second embodiment shown latched.
Figure 11:
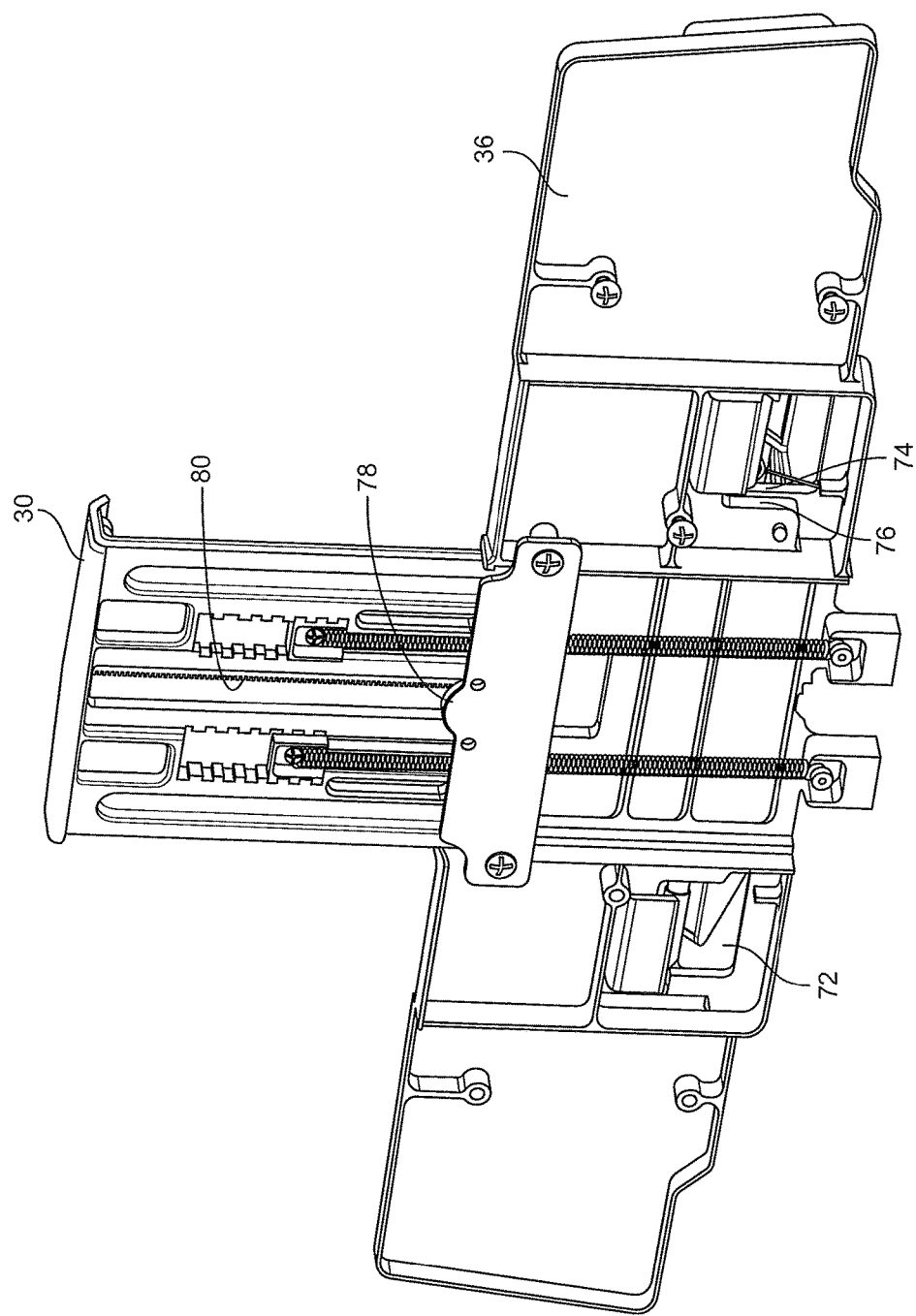
FIG. 11 is a rear perspective view of the device holder according to the second embodiment shown unlatched.

The tray table 24 deploys to substantially horizontally and stows generally flush against the seatback. The shelf 28 of the device holder 22 also stows generally flush against the seatback; however, can deploy to horizontal or at an angle to horizontal. In a preferred embodiment, the orientation of the shelf 28 in a deployed position thereof is sloped/inclined in the direction of the seatback. In a preferred embodiment, the shelf 28 is substantially vertically-oriented and sits flush with surrounding upper seatback shroud 26 when stowed (see FIG. 2), and in the fully deployed position (see FIGS. 3 and 9) comes to rest at an angle from 0° to 45° beyond horizontal, more preferably from 15° to 30° beyond horizontal. The angled orientation of the shelf 28 when deployed positions the shelf out of the viewing area of the device, among other purposes. When deployed, the shelf 28 is oriented to support the bottom edge of the portable electronic device.

The supportive surface or "top" of the shelf 28 can be made from or coated with a high-friction material (e.g., silicone) to help hold the bottom edge of the electronic device in place. The shelf 28 can include one or more catches, ledges, recesses, etc. for holding various sized electronic devices. For example, a large tablet may be held in place near the free end of the shelf 28, while a smaller sized device such as a smartphone may be held closer to the hinged edge. By angling the shelf 28, the distance between the shelf 28 and the latch 30 increases in the direction away from the hinged edge of the shelf 28.

The upper seatback shroud 26 can serve to locate a USB data port 32 to one side of the device holder 22 and an AC power outlet 34 to the other side of the device holder 22. The data and power connections can be positioned together to one side, above or below the device holder 22, or can be separated and flank the device holder 22 as shown. Cabling associated with the data/power outlets can be concealed and routed behind the upper seatback shroud 26. It should be understood that the upper seatback shroud 26 can serve to locate lesser or additional amenities for use by an aft-seated passenger, and can take on any aesthetic form and may be made from any material or combination of materials. Suitable materials include, but are not limited to, hard plastics and other lightweight rigid materials.

Figure 2:
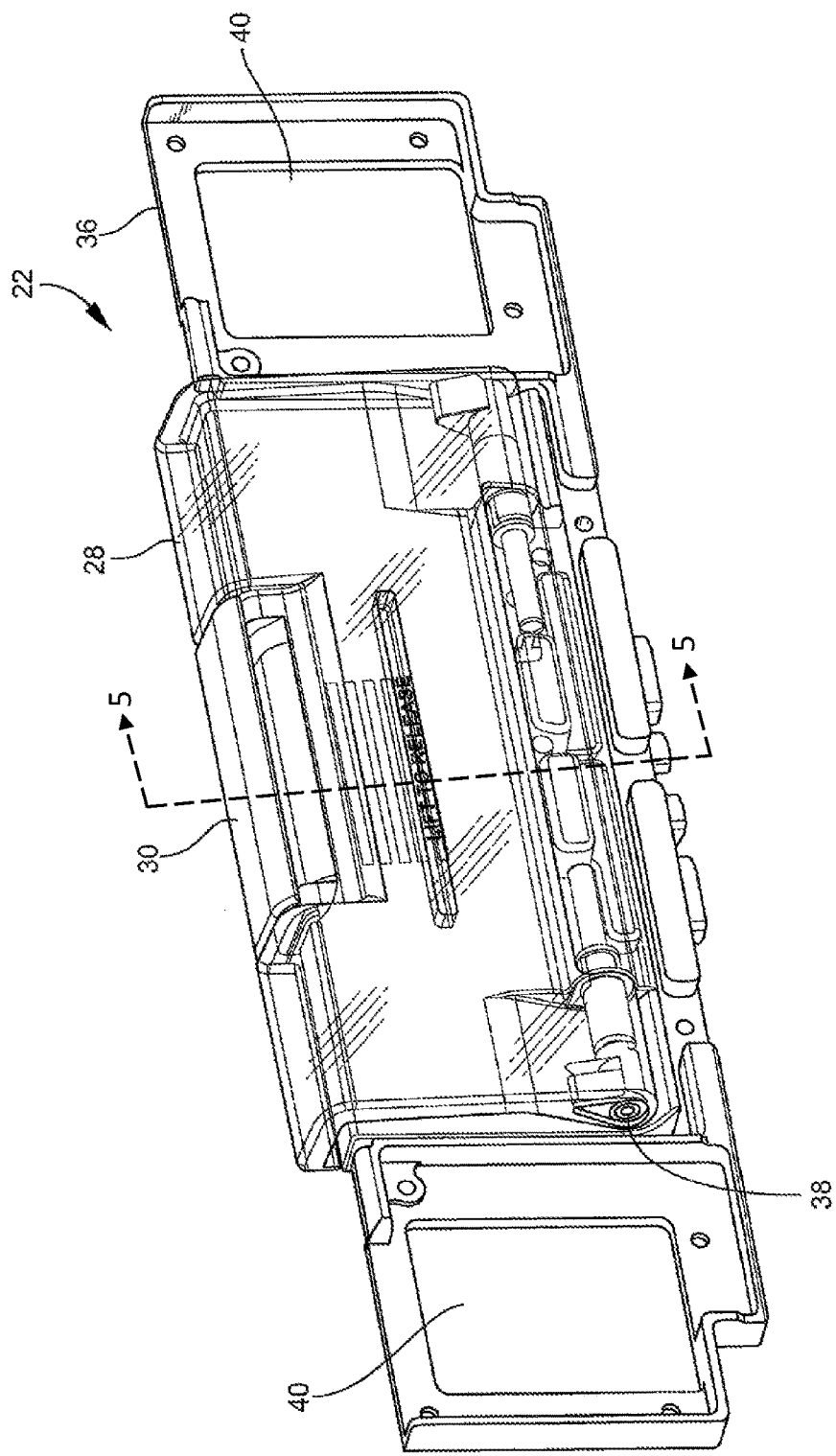
FIG. 2 is a front perspective view of the electronic device holder shown latched.
Figure 3:
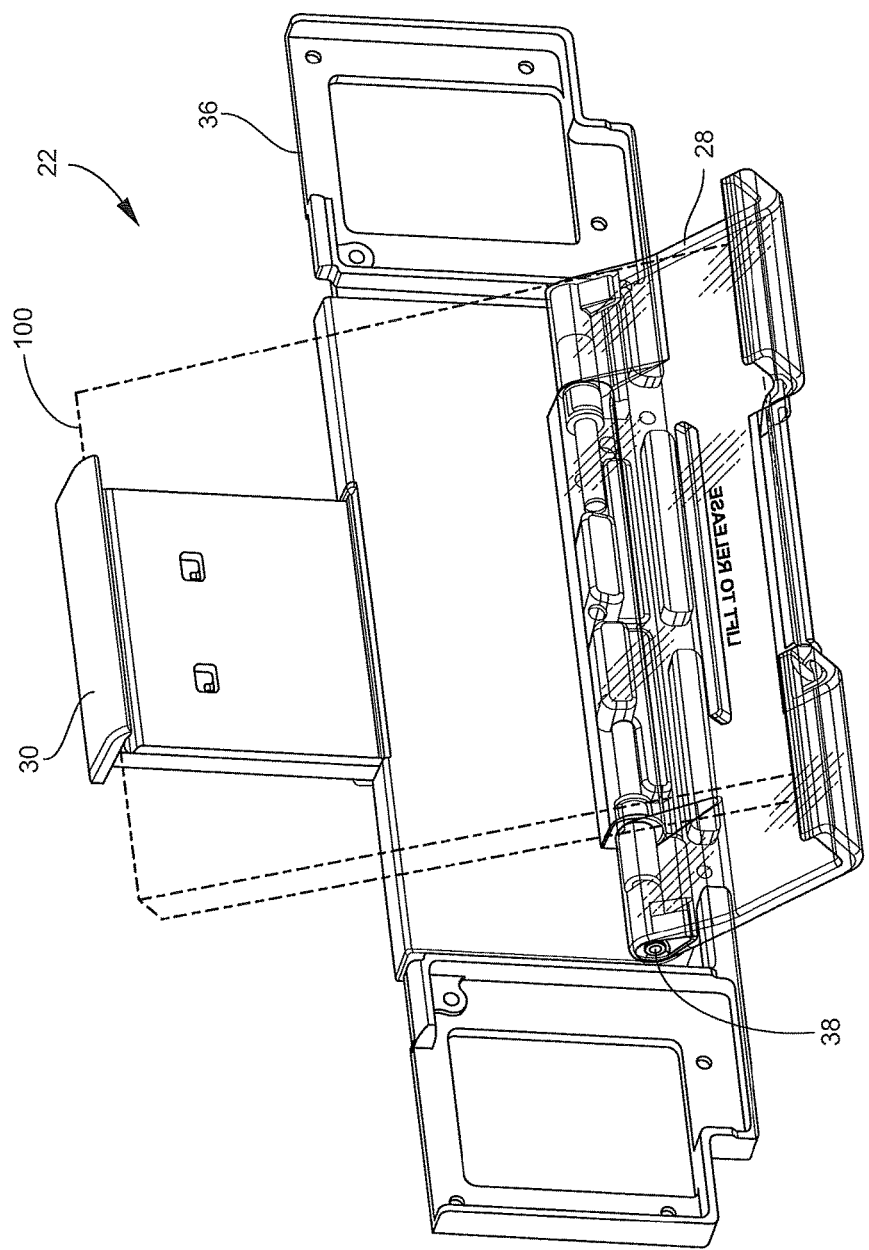
FIG. 3 is a front perspective view of the device holder shown unlatched.
Figure 4:
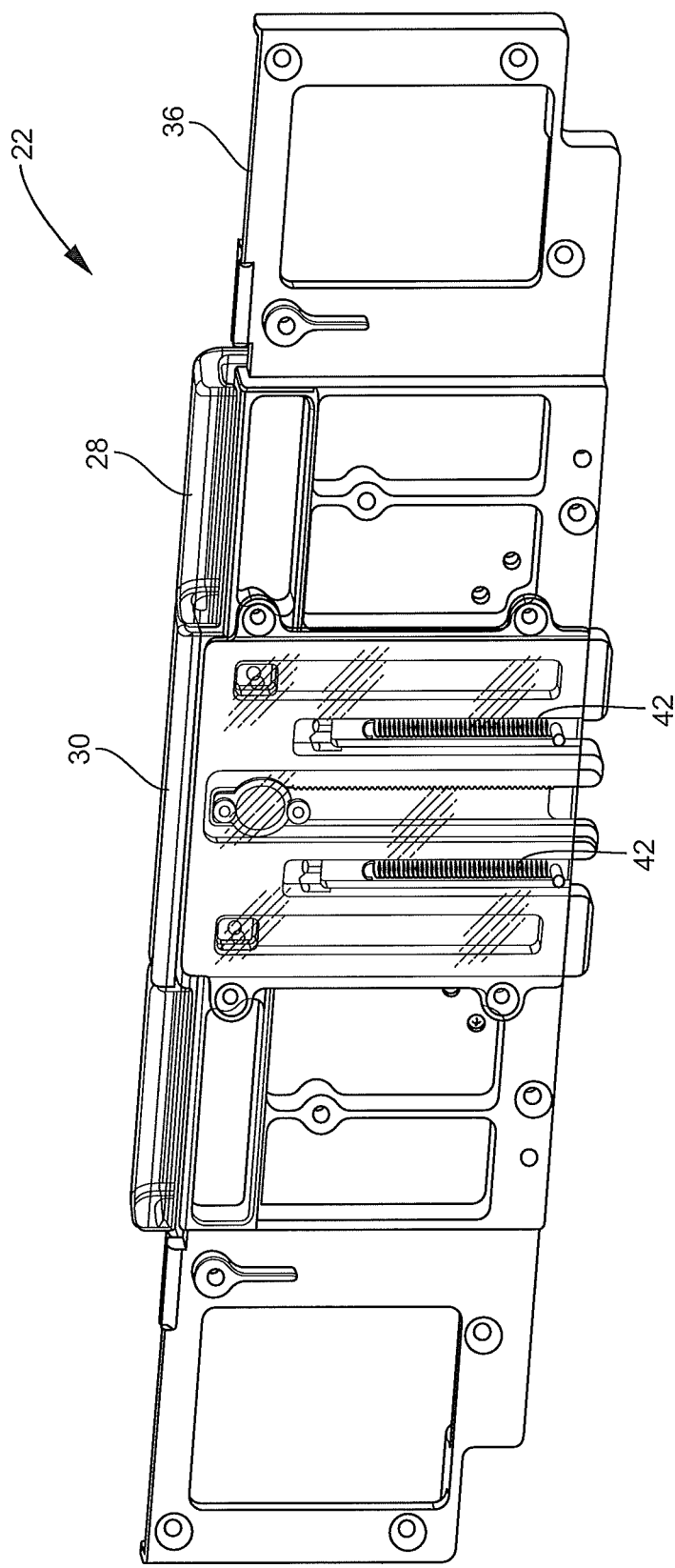
FIG. 4 is a rear perspective view of the electronic device holder shown latched.

FIGS. 2-4 show the device holder 22 removed from the seat and generally including the frame 36, hinged shelf 28, and release latch 30. The frame 36, which can take the form of a backplate, is adapted to be incorporated into the seat and generally concealed from view beneath the upper seatback shroud. The release latch 30 generally functions to retain the shelf 28 in the stowed or "closed" position thereof, and hold the top edge of the portable electronic device when seated on the shelf 28. The shelf 28 as shown is hinged along a bottom edge thereof to the frame 36 such that the top edge of the shelf 28 when released from the latch 30 is free to rotate outward and downward, i.e., away from the frame 36.

The frame 36 is configured to attach to the seatback and/or the backside of the upper seatback shroud 26. The frame 36 can be attaches to the seatback and/or upper seatback shroud 26 using a plurality of fasteners (e.g., screws). The frame 36 is elongate and extends laterally beyond both sides of the shelf 28 and carries the horizontally-oriented pivot 38 about which the shelf 28 pivots. The frame 36 can include openings 40 near opposite ends thereof for receiving the data/power connections therethrough.

The latch 30 is arranged to move relative to the frame 36 into and out of engagement with the top edge of the shelf 28. The latch 30 translates, for examples slides, relative to the frame 36. The latch 30 moves up to release the shelf 28 to allow the free edge thereof to pivot out, and moves down to capture the shelf 28 to hold the shelf 28 flush against the upper shroud 26 when stowed. The latch 30 is preferably biased in the downward direction by a pair of vertically-oriented spaced parallel springs 42 attached between the latch 30 and the frame 36. As the latch 30 is manually moved upwards, the springs 42 are stretched and loaded. In use, when the shelf 28 is deployed, the latch 30 is used to secure the "top" of the electronic device, while the "bottom" of the electronic device sits on the shelf. The electronic device, for example generic device 100 in FIG. 3, is held between the latch 30 and the shelf 28 by the compressive force of the spring-loaded latch 30. The latch 30 has a predetermined range of travel sufficient to accommodate both large and small electronic devices.

Figure 5:
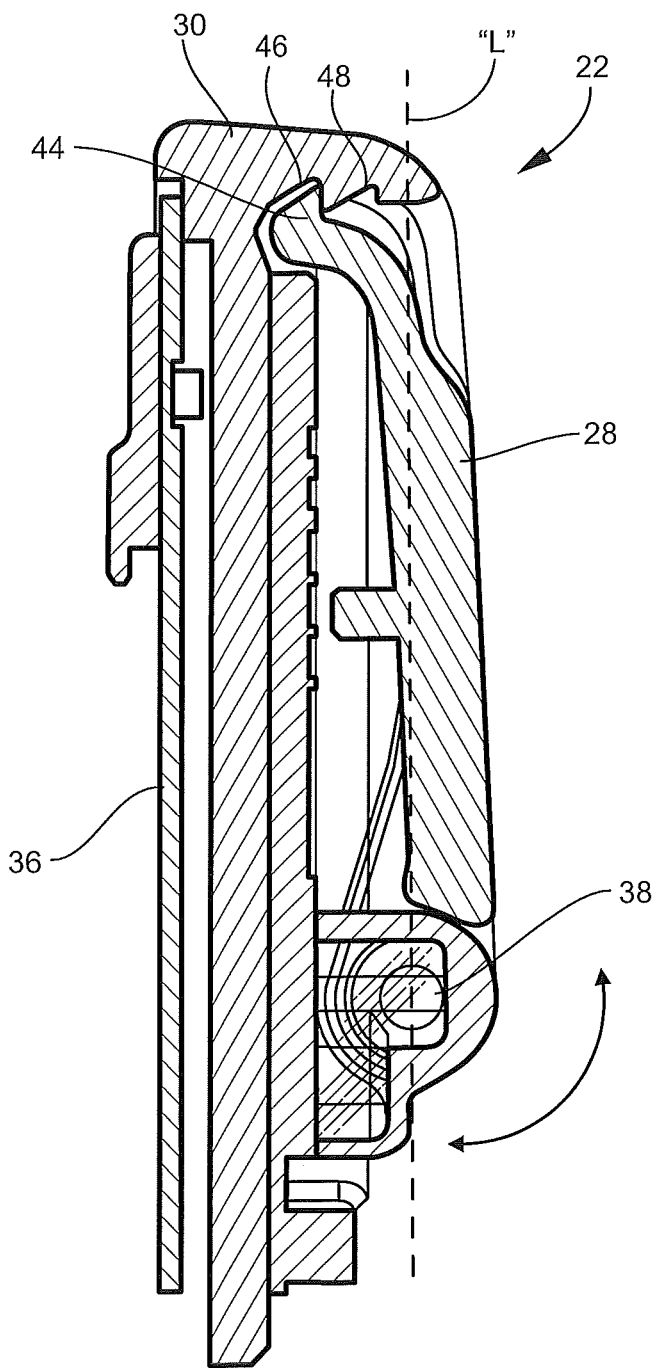
FIG. 5 is a sectional view through the device holder shown latched, taken along line 5-5 of FIG. 2.

FIG. 5 shows the location of the main pivot point 38 relative to the latching point. Locating the latching point horizontally behind the main pivot point 38 in the seat requires the top or "free" edge of the shelf 28 to move past vertical "V" to engage with the latch 30. In this arrangement, the free edge of the shelf 28 is required to rotate up and out to release, thereby lessening the chances that the shelf 28 will deploy accidentally or unintentionally. The top edge of the shelf 28 can include a hook 44 that engages within primary and secondary latches 46, 48 of the latch 30. As the shelf 28 is moved to the stowed position thereof, the hook 44 first engages within the secondary latch 48. As the shelf 28 continues in the direction of the frame 36, the hook 44 ramps passed the secondary latch 48 and engages within the primary latch 46. Redundant latches can be provided to prevent accidental deployment and increase the chances of latching in the event of a head strike.

FIGS. 6a and 6b show a spring release mechanism 50 for rotating the shelf once released from the latch. A release lever 52 engages at one end thereof with a spring release pivot mount 54 mounted on a common shaft 56. The end of the spring release pivot mount 54 in contact with the end of the release lever 52 is sloped such that engagement with the sloped surface causes rotation because of the stored spring force. A spring 58, which is disposed between the release lever 52 and the shaft 56, pushes on the release lever 52 thereby causing the rotation. The spring 58 is wound as the shelf is moved towards stowed and the spring release pivot mount 54 rotated relative to the release lever 52.

FIGS. 7a and 7b show a friction mechanism 60 for dampening the deployment and stowage rotation of the shelf. A friction pivot mount 62 and friction lever 64 are mounted on a common shaft 66. A spring 68 is located between the friction lever 64 and the shaft 66. The flat surfaces on the facing ends of the friction pivot mount 62 and friction lever 64 contact each other to generate friction therebetween to dampen the shelf rotation. The wound spring 68 pushes on the friction lever 64 to add force which slows shelf rotation during deployment and stowage. The spring release mechanism and friction mechanism 60 are axially aligned with the pivot 38 and are located on opposite sides of the hinge of the shelf.

Figure 8:
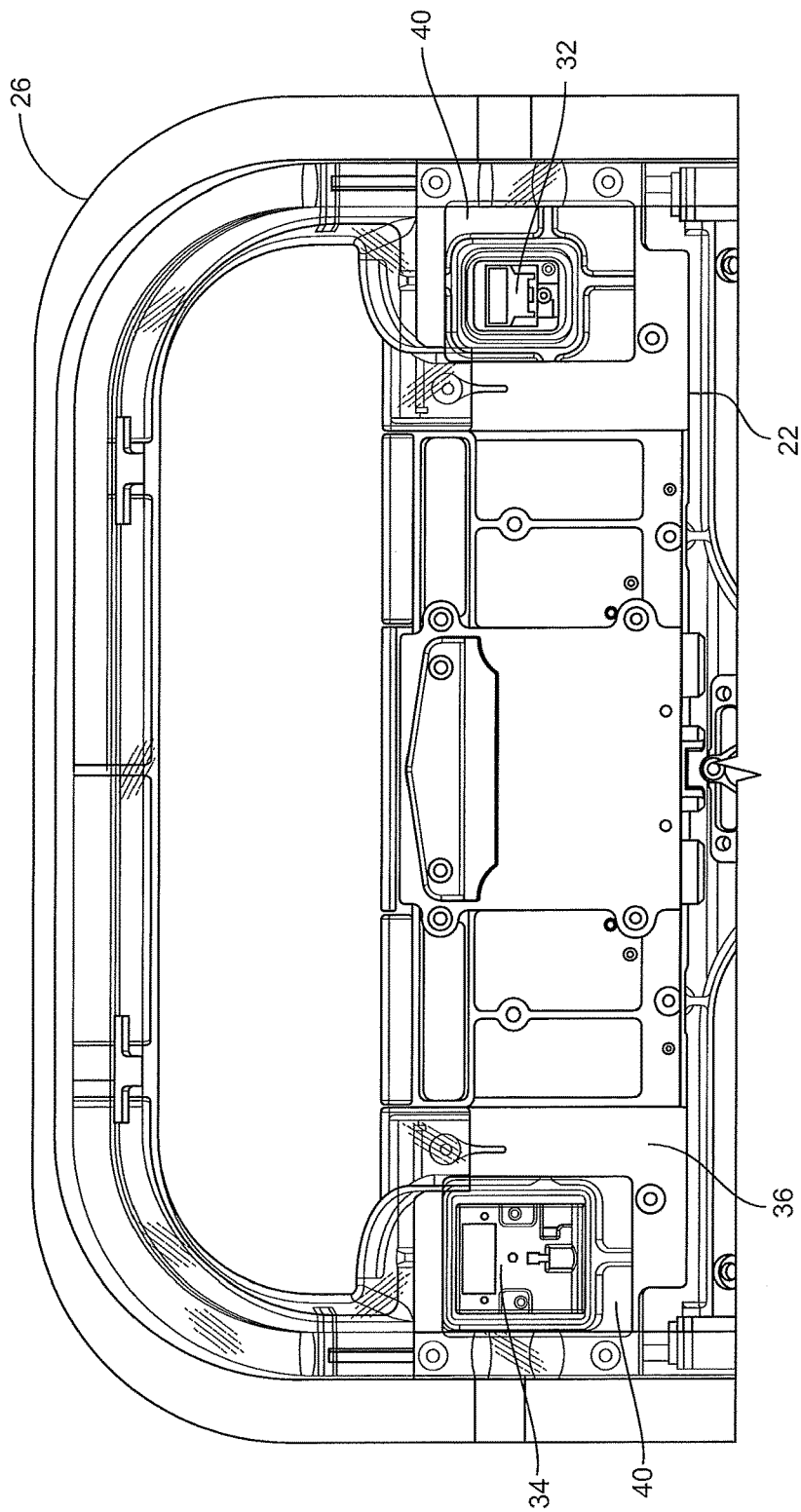
FIG. 8 shows the device holder incorporated into the upper shroud of the seatback.

FIG. 8 shows the location and incorporation of the device holder 22 into the upper seatback shroud 26. The device holder may attach to a "backside", which can be forward facing in the case of a forward facing seat, of the upper seatback shroud 26 using a plurality of fasteners (e.g., screws). The device holder 22 packages generally flush against the backside of the upper seatback shroud 26 or within the shroud to provide a low-profile, shallow-depth upper shroud. The openings 40 through the frame 36 provide clearance for the USB port 32 and AC receptacle 34. Associated cabling can be routed to one or both sides of the device holder 22.

FIGS. 9-12 show an electronic device holder 22 according to a second embodiment of the invention adapted to be installed in an upper seatback shroud 26. Compared to the first embodiment of the device holder 22 discussed above, the shelf 28 of the second embodiment attaches/moves by way of spaced parallel arms 70. Each of the arms 70 have a predetermined length and curvature such that they retract into the upper shroud 26 and are hidden from view when the shelf 28 is stowed, and position the shelf 28 apart from the upper shroud 26 when the shelf 28 is deployed. Like the first embodiment discussed above, the latch 30 is spring-loaded to be compressive to hold the shelf 28 or electronic device. The arms 70 pass through a pair of openings 72 through the frame 36, which may also include another pair of openings for clearing the data and power connectors when present.

The device holder 22 can include a torsion spring 74 and Bellville washer clutch 76 (i.e., coned-disc springs) arrangement for preloading the shelf 28 to impart rotational movement upon latch 30 release, wherein the torsion spring 74 is loaded as the shelf 28 moves toward the stowed position. The device holder 22 can further include a rotary damper 78 that engages with a toothed gear rack 80 for dampening return motion of the latch 30.

Figure 12:
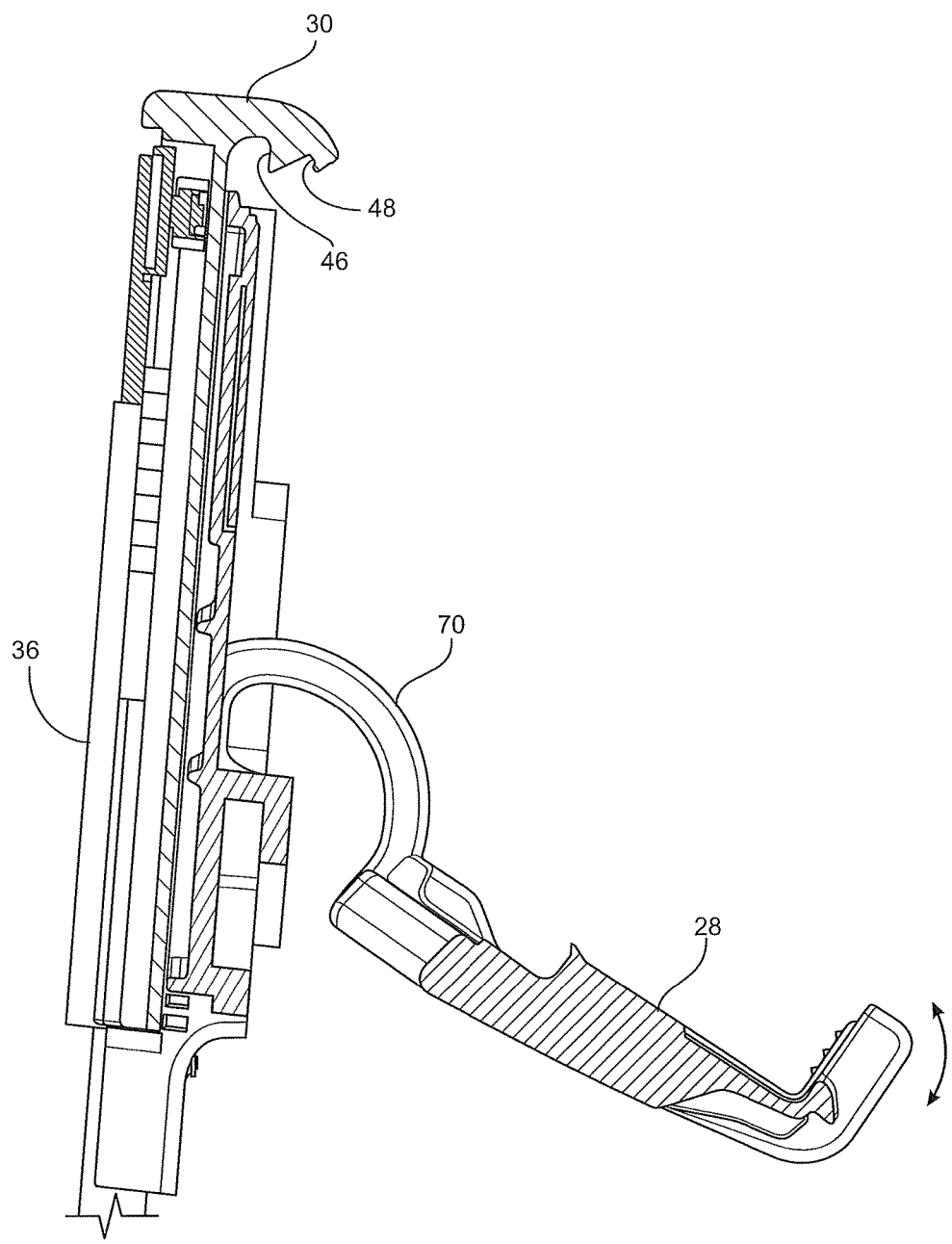
FIG. 12 is a sectional view through the device holder according to the second embodiment shown unlatched, taken along line 12-12 of FIG. 10.

FIG. 12 shows the shelf 28 fully deployed and the primly and secondary latches 46, 48 of the release latch 30 available for engaging the top edge of the brought-aboard portable electronic device. In the fully deployed position, the aims 70 space the shelf 28 apart from the frame 36 and at an angle to horizontal.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A portable electronic device holder adapted to be incorporated into a seatback of a passenger seat, comprising:
   a frame adapted to install in a seatback shroud;
   a shelf mounted to the frame such that the shelf is adapted to be exposed through a seatback shroud, the shelf moveable between a stowed position flush with the frame and a deployed position at an angle to the frame;
   a latch slidably attached to the frame and biased in a downward direction, the latch configured to engage a top of the shelf to hold the shelf in the stowed position and raise to release the shelf to allow the shelf to move to the deployed position; and
   a spring release mechanism associated with the shelf for rotating the shelf toward the deployed position when released from the latch, the spring mechanism including a release lever that engages at one end thereof with a spring release pivot mount mounted on a common shaft;
   wherein the shelf, when in the deployed position, is oriented such that the shelf is adapted to support a bottom edge of a portable electronic device and the latch is oriented such that the shelf is adapted to engage a top edge of the portable electronic device.

2. The portable electronic device holder according to claim 1, wherein the shelf is pivotally attached along a bottom edge to the frame.

3. The portable electronic device holder according to claim 1, wherein the shelf is attached to the frame through spaced arms attached near opposite ends of the bottom edge of the shelf, each of the arms having a predetermined length and curvature such that the arms retract into the seatback and are hidden when the shelf is in the stowed position and position the shelf apart from the seatback shroud when the shelf is in the deployed position.

4. The portable electronic device holder according to claim 1, wherein the frame includes a backplate adapted to be concealed from view behind the seatback shroud.

5. The portable electronic device holder according to claim 1, wherein an end of the spring release pivot mount in contact with the end of the release lever is a sloped surface such that engagement with the sloped surface causes rotation due to stored spring force from a spring disposed between the release lever and the shaft, wherein the spring is wound as the shelf is moved toward the stowed position.

6. The portable electronic device holder according to claim 1, further comprising a friction mechanism arranged to dampen deployment and stowage rotation of the shelf, the friction mechanism including a friction pivot mount and friction lever mounted on a common shaft and a spring disposed between the friction lever and the shaft, wherein flat facing ends of the friction pivot mount and friction lever contact to generate friction therebetween to dampen shelf rotation and the spring, when wound, urges on the friction lever to add force which slows shelf rotation during deployment and stowage.

7. The portable electronic device holder according to claim 1, wherein the frame is an elongate backplate having spaced openings flanking the shelf.

8. The portable electronic device holder according to claim 1, further comprising vertically-oriented spaced springs attached at one end to the latch and at an opposing end to the frame, the vertically-oriented spaced springs biasing the latch in a direction of the shelf.

9. An aircraft passenger seat equipped with a seatback portable electronic device holder, comprising:
   an upper seatback shroud;
   a backplate installed behind the upper seatback shroud;
   a shelf mounted to the backplate and exposed through the upper seatback shroud, the shelf moveable between a stowed position flush with the backplate and a deployed position at an angle to the backplate;
   a latch slidably attached to the backplate and biased in a downward direction, the latch configured to engage a top of the shelf to hold the shelf in the stowed position and raise to release the shelf to allow the shelf to move to the deployed position; and
   a friction mechanism arranged to dampen deployment and stowage rotation of the shelf, the friction mechanism including a friction pivot mount and friction lever mounted on a common shaft and a spring disposed between the friction lever and the shaft, wherein flat facing ends of the friction pivot mount and friction lever contact to generate friction therebetween to dampen shelf rotation and the spring, when wound, urges on the friction lever to add force which slows shelf rotation during deployment and stowage;
   wherein the shelf, when in the deployed position, is oriented to support a bottom edge of a portable electronic device and the latch is available to engage a top edge of the portable electronic device.

10. The aircraft passenger seat according to claim 9, wherein the latch includes a primary latch and a secondary latch.

11. The aircraft passenger seat according to claim 9, wherein the shelf is pivotally attached along a bottom edge to the backplate.

12. The aircraft passenger seat according to claim 9, wherein the shelf is attached to the backplate through spaced arms attached near opposite ends of the bottom edge of the shelf, each of the arms having a predetermined length and curvature such that the arms retract into the seatback and are hidden when the shelf is in the stowed position and position the shelf apart from the upper seatback shroud when the shelf is in the deployed position.

13. The aircraft passenger seat according to claim 9, further comprising a spring release mechanism associated with the shelf for rotating the shelf toward the deployed position when released from the latch, the spring mechanism including a release lever that engages at one end thereof with a spring release pivot mount mounted on a common shaft.

14. The aircraft passenger seat according to claim 13, wherein an end of the spring release pivot mount in contact with the end of the release lever is a sloped surface such that engagement with the sloped surface causes rotation due to stored spring force from a spring disposed between the release lever and the shaft, wherein the spring is wound as the shelf is moved toward the stowed position.

15. The aircraft passenger seat according to claim 9, further comprising a torsion spring and washer clutch arranged to pre-load the shelf to impart rotational movement upon latch release, wherein the torsion spring is loaded as the shelf is moved toward the stowed position.

16. The aircraft passenger seat according to claim 9, further comprising a USB port and an AC receptacle opening through a face of the upper seatback shroud, wherein the backplate includes spaced openings flanking the shelf for receiving the USB port and the AC receptacle therethrough.

17. The aircraft passenger seat according to claim 9, further comprising vertically-oriented spaced springs attached at one end to the latch and at an opposing end to the backplate, the vertically-oriented spaced springs biasing the latch in a direction of the shelf.

18. The aircraft passenger seat according to claim 9, further comprising a deployable tray table positioned below the shelf and spaced apart therefrom such that the shelf and the deployable tray table can be deployed and used at the same time.

\* \* \* \* \*